US012764302B2

(12) United States Patent
Li

(10) Patent No.: US 12,764,302 B2
(45) **Date of Patent: *Oct. 13, 2026**

(54) TECHNIQUES FOR INCREASING THE ACCURACY OF SUBJECTIVE QUALITY EXPERIMENTS

(71) Applicant: NETFLIX, INC., Los Gatos, CA (US)

(72) Inventor: Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,544

(22) Filed: Jun. 14, 2022

(65) Prior Publication Data

US 2022/0383348 A1 Dec. 1, 2022

Related U.S. Application Data

(63) Continuation of application No. 16/945,737, filed on Jul. 31, 2020, now Pat. No. 11,363,275.

(51) Int. Cl.
*H04N 19/149* (2014.01)
*G06Q 30/0203* (2023.01)
(Continued)

(52) U.S. Cl.
CPC ....... *H04N 19/149* (2014.11); *G06Q 30/0203* (2013.01); *H04L 65/80* (2013.01); *H04N 19/154* (2014.11)

(58) Field of Classification Search
CPC ............... H04N 19/149; H04N 19/154; H04N 21/4667; G06Q 30/0203; H04L 65/80
See application file for complete search history.

(56) References Cited

U.S. PATENT DOCUMENTS

2002/0090134 A1 7/2002 Van Zon
2003/0234865 A1 12/2003 Ali
(Continued)

OTHER PUBLICATIONS

L. Janowski and M. Pinson, "The Accuracy of Subjects in a Quality Experiment: A Theoretical Subject Model," in IEEE Transactions on Multimedia, vol. 17, No. 12, pp. 2210-2224, Dec. 2015.*
(Continued)

*Primary Examiner* — Shahan Ur Rahaman
(74) *Attorney, Agent, or Firm* — Artegis Law Group, LLP

(57) ABSTRACT

In various embodiments, a data optimization application mitigates scoring inaccuracies in subjective quality experiments. In operation, the data optimization application generates a model that includes a first set of individual scores and a first set of parameters. The first set of parameters includes a first subjective score set and a first set of subjective factor sets. The data optimization application performs one or more optimization operations on the first set of parameters to generate a second set of parameters. The second set of parameters includes a second subjective score set and a second set of subjective factor sets, wherein the second subjective score set compensates for at least a first subjective factor set included in the second set of subjective factor sets. The data optimization application also computes a participant evaluation report based on at least a second subjective factor sets included in the second set of subjective factor sets

19 Claims, 4 Drawing Sheets

(51) Int. Cl.
*H04L 65/80* (2022.01)
*H04N 19/154* (2014.01)

(56) References Cited

U.S. PATENT DOCUMENTS

| | | | | |
|---|---|---|---|---|
| 2006/0152585 | A1 | 7/2006 | Bourret et al. | |
| 2007/0103551 | A1 | 5/2007 | Kim et al. | |
| 2012/0030367 | A1 | 2/2012 | Lei et al. | |
| 2014/0093174 | A1* | 4/2014 | Zhang | G06F 16/5854 382/190 |
| 2014/0100820 | A1 | 4/2014 | Sone et al. | |
| 2014/0122506 | A1 | 5/2014 | Jebara et al. | |
| 2014/0278485 | A1* | 9/2014 | Grant | G06Q 30/0201 705/2 |
| 2014/0278738 | A1* | 9/2014 | Feit | G06Q 30/0201 705/7.29 |
| 2016/0021376 | A1 | 1/2016 | Andreopoulos et al. | |
| 2016/0212432 | A1* | 7/2016 | Wang | G06V 20/40 |
| 2016/0224803 | A1* | 8/2016 | Frank | G06F 21/6245 |
| 2018/0121730 | A1* | 5/2018 | Li | G06T 7/0002 |
| 2019/0042081 | A1* | 2/2019 | Rosenberg | H04L 67/535 |
| 2020/0322694 | A1 | 10/2020 | Colligan et al. | |

OTHER PUBLICATIONS

ITU-T P.913 "Methods for the subjective assessment of video quality, audio quality and audiovisual quality of Internet video and distribution quality television in any environment", Jan. 2014.*
"Recommendation ITU-R BT.500-14; Methodologies for the subjective assessment of the quality of television images"; Oct. 2009 (hereinafter BT.500).*
Kuhlisch et al., "A statistical approach to calibrating the scores of biased reviewers of scientific papers", Metrika, Springer Berlin Heidelberg, Berlin/Heidelberg, vol. 29, No. 1, Apr. 24, 2015, pp. 27-57.
Wang et al., "Image Quality Assessment: From Error Visibility to Structural Similarity", IEEE Transactions on Image Processing, vol. 13, No. 4, Apr. 2004, pp. 1-14.
Aaron et al., "Per-Title Encode Optimization—Netflix TechBlog—Medium", Available on: http://techblog.netflix.com/2015/12/ per-title-encode-opt, Dec. 14, 2015, 15 pages.
Li et al., "Toward a Practical Perceptual Video Quality Metric", Available on: http://techblog.netflix.com/2016/06/toward-practical-perceptual-video.html, Jun. 6, 2016, pp. 1-24.
Lin et al., "A Fusion-based Video Quality Assessment (FVQA) Index", APSIPA Trans. Signal and Information Processing, Dec. 9-12, 2014, 5 pages.
Wolf et al., "Video Quality Model for Variable Frame Delay (VQM_VFD)", NTIA Technical Memorandum TM-11-482, U.S. Department of Commerce, Sep. 2011, 27 pages.
Cortes et al., "Support-Vector Networks", Machine Learning, vol. 20, No. 3, 1995, pp. 273-297.
Seshadrinathan et al., "Study of Subjective and Objective Quality Assessment of Video", IEEE Transactions on Image Processing, vol. 19, No. 6, Jun. 2010, pp. 1427-1441.
Rec. ITU-R BT.500-11, "Methodology for the Subjective Assessment of the Quality of Television Pictures", Available on: https://www.itu.int/rec/R-REC-BT.500, pp. 1-48.
Mackay, David J.C., "Information Theory, Inference, and Learning Algorithms", Cambridge University Press 2003, Version 7.2, Mar. 28, 2005, 640 pages.
Cover et al., "Elements of Information Theory", Second Edition, Wiley-Interscience publication, 2006, 774 pages.
"VMAF—Video Multi-Method Assessment Fusion", Available on: https://github.com/Netflix/vmaf, retrieved on Apr. 5, 2018, 13 pages.
ITU-T P.910, "Subjective Video Quality Assessment Methods for Multimedia Applications", Series P: Telephone Transmission Quality, Telephone Installations, Local Line Networks, Apr. 2008, 42 pages.
Janowski et al., "The Accuracy of Subjects in a Quality Experiment: A Theoretical Subject Model", IEEE Transactions on Multimedia, vol. 17, No. 12, Dec. 2015, pp. 2210-2224.
Whitehill et al., "Whose Vote Should Count More: Optimal Integration of Labels from Labelers of Unknown Expertise", Advances in Neural Information Processing Systems, 2009, pp. 1-9.
Wang et al., "Image Quality Evaluation using Image Quality Ruler and Graphical Model", IEEE International Conference on Image Processing (ICIP), 2015, 5 pages.
"Nelflix Public Dataset", Available on: https://github.com/Netflix/vmaf#netflix-public-dataset, 12 pages.
"Report on the Validation of Video Quality Models for High Definition Video Content", Video Quality Experts Group (VQEG), Tech. Rep., Version 2.0, Jun. 30, 2010, pp. 1-93.
ITU-R BT.500-14 (Oct. 2019): Methodologies for the Subjective Assessment of the Quality of Television Images, 2019, 1 page.
ITU-T P.913 (Mar. 2016): Methods for the Subjective Assessment of Video Quality, Audio Quality and Audiovisual Quality of Internet Video and Distribution Quality Television in Any Environment, 2016, 1 page.
Pinson et al., "The influence of subjects and environment on audiovisual subjective tests: An International study", IEEE Journal of Selected Topics in Signal Processing, vol. 6, No. 6, Oct. 2012, 29 pages.
Zhang et al., "A Perception-Based Hybrid Model for Video Quality Assessment", IEEE Transactions on Circuits and Systems for Video Technology, vol. 26, No. 6, Jun. 2016, pp. 1017-1028.

* cited by examiner

TECHNIQUES FOR INCREASING THE ACCURACY OF SUBJECTIVE QUALITY EXPERIMENTS

CROSS-REFERENCE TO RELATED APPLICATIONS

This application is a continuation of the co-pending U.S. patent application titled, "TECHNIQUES FOR INCREASING THE ACCURACY OF SUBJECTIVE QUALITY EXPERIMENTS", filed on Jul. 31, 2020, and having Ser. No. 16/945,737. The subject matter of the related application is hereby incorporated herein by reference.

BACKGROUND

Field of the Various Embodiments

The various embodiments relate generally to computer science and, more specifically, to techniques for increasing the accuracy of subjective quality experiments.

Description of the Related Art

Some providers of digital items and services conduct subjective quality experiments in an attempt to understand the quality levels of the digital items and services as perceived by consumers of the digital items and services. Some examples of digital items and services include, without limitation, images, music, movies, streaming services, websites, and cloud-based software. In a typical subjective quality experiment, human participants perform various tasks, where each task is associated with a different digital item and/or digital service. As the participants perform the tasks, each participant assigns an individual score to each task, where each individual score ranks a quality-related aspect of the associated task. For each of the tasks, the provider then computes an aggregated subjective score based on the individual scores. Typically, the subjective score associated with a given task estimates the score that an "average" person would assign to that task.

One problem associated with subjective quality experiments is that individual scores typically include inaccuracies that degrade the accuracy of the subjective scores generated based on the individual scores. For example, individual scores oftentimes include inaccuracies attributable to subjective factors, such as participant bias and participant inconsistency. In an example of participant bias, participants that are relatively picky tend to assign lower individual scores than participants that are relatively undemanding. In an example of participant inconsistency, some participants are unable to maintain a consistent level of attentiveness while performing a series of tasks and, consequently, assign individual scores in an inconsistent manner.

In one approach to mitigating scoring inaccuracies in subjective quality experiments, systematic inaccuracies associated with individual scores of the different participants are estimated and accounted for when determining the final subjective score for a given task. A systematic inaccuracy is a consistent offset in the individual scores of a particular participant relative to the subjective scores. One drawback of such an approach is that the accuracies associated with subjective scores can still be adversely impacted by subjective factors that vary unpredictably. For example, if a given participant were to lose focus when performing a given task and assign several individual scores for that task randomly, then the accuracies associated with the subjective scores for the task would be reduced regardless of whether the subjective score is adjusted to account for one or more systemic inaccuracies.

To mitigate unpredictable or random scoring inaccuracies in subjective quality experiments, the number of participants in a subjective quality experiment can be increased, thereby increasing the total number of individual scores for each task included in the experiment. As a general matter, increasing the total number of individual scores for a given task reduces the impact of random inaccuracies on the subjective score for that task. One drawback with this approach, though, is that the resources involved in recruiting and training the participants for a given subjective quality experiment as well conducting the subjective quality experiment increases as the total number of participants in the subjective quality experiment increases. Further, even when the number of participants in a subjective quality experiment is increased, the level of inaccuracy in the individual scores for the different tasks in the experiment still can be great enough to prevent the subjective scores for the different tasks from having the appropriate or desired level of overall accuracy.

As the foregoing illustrates, what is needed in the art are more effective techniques for mitigating scoring inaccuracies in subjective quality experiments.

SUMMARY

One embodiment sets forth a method for mitigating scoring inaccuracies in subjective quality experiments. The method includes generating a model that includes individual scores and a first set of parameters, where the first set of parameters includes a first subjective score set and a first set of subjective factor sets; performing one or more optimization operations on the first set of parameters to generate a second set of parameters that includes a second subjective score set and a second set of subjective factor sets, where the second subjective score set compensates for at least a first subjective factor set included in the second set of subjective factor sets; and computing a participant evaluation report based on at least a second subjective factor set included in the second set of subjective factor sets.

At least one technical advantage of the disclosed techniques relative to the prior art is that the disclosed techniques can be used to mitigate both systematic and random inaccuracies associated with the individual scores in subjective quality experiments, thereby increasing the overall accuracy of the subjective scores associated with subjective quality experiments. In that regard, optimizing the model parameters automatically adjusts the subjective scores to compensate for participant bias, while quantifying participant inconsistency via the automatically-generated participant evaluation report enables random inaccuracies associated with the individual scores to be reduced. In particular, the automatically-generated participant evaluation report can be used to filter-out participants associated with random scoring variations, thereby increasing the accuracy of the subjective scores associated with a given subjective quality experiment without unnecessarily increasing the number of participants in the experiment. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
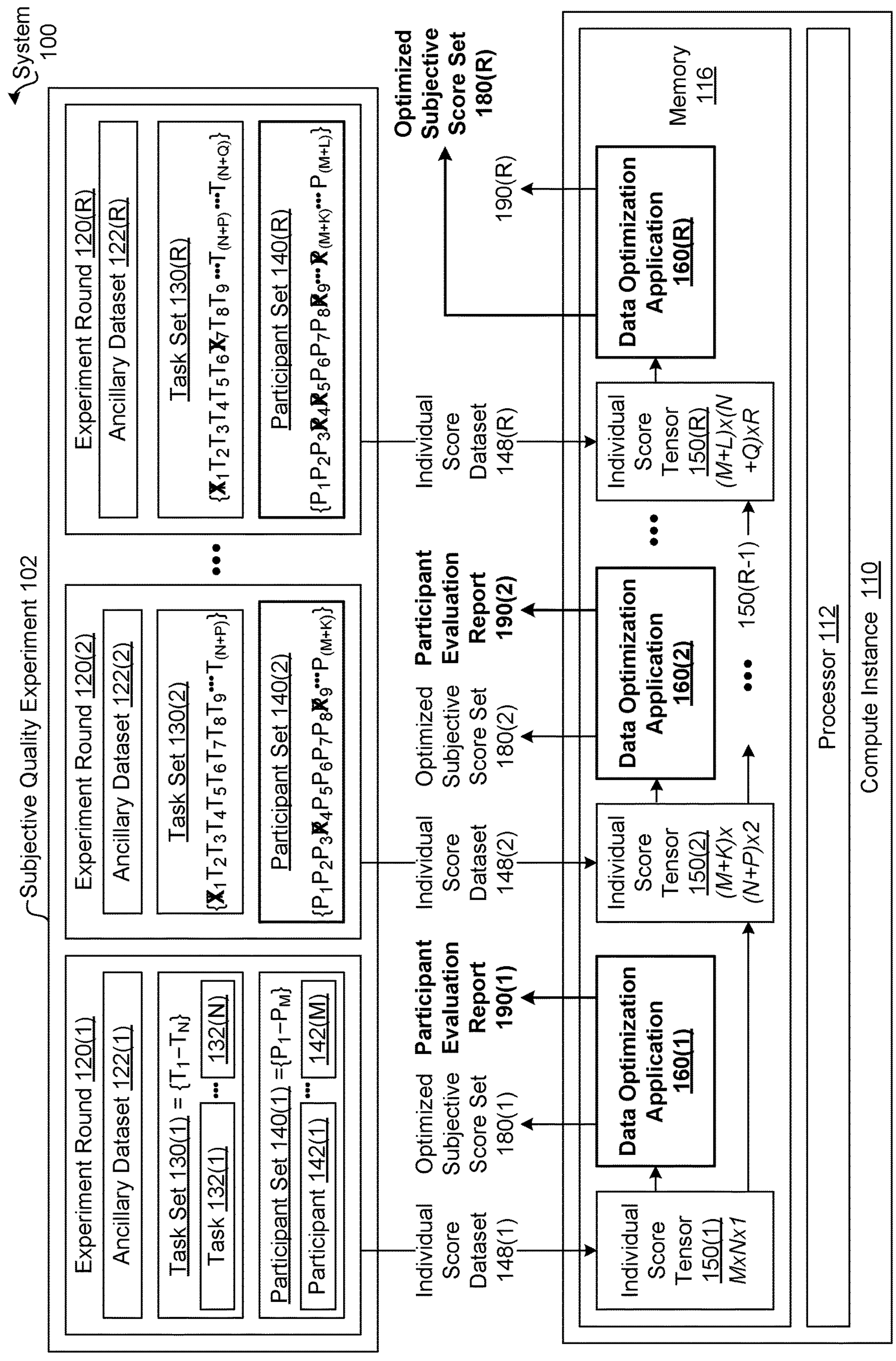
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Some providers of digital items and services conduct subjective quality experiments in an attempt to understand the quality levels of the digital items and services as perceived by consumers. For example, some streaming media services conduct subjective quality experiments to understand the quality levels, as perceived by actual viewers, of reconstructed media clips generated by encoding and then decoding media clips. In some such subjective quality experiments, each of numerous human participants sequentially watches and assigns individual scores to different reconstructed media clips, where each individual score indicates a level of visual quality. For each of the reconstructed media clips, the streaming media service aggregates the individual scores for the reconstructed media clip to determine an overall subjective score that estimates the visual quality level of the reconstructed media clip as perceived by an average viewer.

One problem associated with subjective quality tests is that human participants are fallible, and the individual scores can therefore include inaccuracies that degrade the accuracy of the subjective scores. For example, individual scores can be impacted by participant bias and participant inconsistency. In an example of participant bias, participants that are relatively picky tend to assign lower individual scores than participants that are relatively undemanding. In an example of participant inconsistency, some participants are unable to maintain a consistent level of attentiveness while watching numerous reconstructed video clips and, consequently, assign individual scores in an inconsistent manner.

In one conventional approach to mitigating inaccuracies in subjective quality experiments, participant biases are estimated and accounted for when computing the subjective scores. However, participant inconsistencies result in random inaccuracies in the individual scores that cannot be predicted and can therefore still degrade the accuracy of the subjective scores. To mitigate participant inconsistencies, the number of participants in and therefore the total number of individual scores generated during a subjective quality experiment can be increased. As a general matter, increasing the total number of individual scores used to compute a subjective score reduces the impact of random inaccuracies on the subjective score. One drawback of increasing the number of participants in a subjective quality experiment is that the amount of resources involved in recruiting and training the participants as well as conducting the subjective quality experiment also increases. Furthermore, despite increasing the number of participants, inaccuracies in the individual scores can still prevent the subjective scores from achieving a desired level of accuracy.

With the disclosed techniques, however, a subjective quality experiment is conducted in sequential experiment rounds and after each experiment round, a data optimization application generates an optimized subjective score set and a participant evaluation report based on the individual scores acquired thus-far. The subjective scores included in the optimized subjective score set compensate for the participant biases. The participant evaluation report can include any amount of information that indicates which of the participants are associated with the highest levels of random inaccuracies and, consequently, are the worst performing participants. The participant evaluation report can be used to filter-out the worst performing participants, thereby reducing the random inaccuracies associated with the individual scores for the subsequent experiment rounds.

In some embodiments, the data optimization engine includes a subjective modeling engine and a participant evaluation engine. After each experiment round, the data optimization engine generates a model for an individual score tensor that includes the individual scores acquired thus-far during the subjective quality experiment. The model includes initial subjective scores for the reconstructed video clips as well as initial participant biases and initial participant inconsistencies for the participants that have participated in at least one experiment round. The subjective modeling engine jointly optimizes the subjective scores, the participant biases, and the participant inconsistencies to fit the individual scores included in the individual score tensor. Notably, the optimized subjective scores compensate for the optimized participant biases.

The participant evaluation engine ranks the participants based on the participant inconsistencies in decreasing order to generate a ranked participant set. The participant evaluation engine then generates a rejection recommendation based on the optimized participant inconsistencies, the ranked participant set, and a rejection criterion, such as the three most inconsistent participants or the participants having participant inconsistencies greater than 0.7. The participant evaluation engine assembles the ranked participant set, the associated participant inconsistencies, and the rejection recommendation into a participant evaluation report.

At least one technical advantage of the disclosed techniques relative to the prior art is that the data optimization application can be used to mitigate both systematic and random inaccuracies associated with the individual scores in subjective quality experiments, as a result, the overall accuracy of the subjective scores associated with subjective quality experiments can be increased. More precisely, the subjective modeling engine automatically optimizes the subjective scores to compensate for participant bias while quantifying the participant inconsistencies. By specifying the participant inconsistencies in the participant evaluation report, the participation evaluation engine enables random inaccuracies associated with participant inconsistency to be reduced. As a result, relative to prior art techniques, the data optimization application can enable the total amount of resources required to generate subjective scores having an appropriate or desired level of overall accuracy to be reduced. Conversely, for a given amount of resources, the data optimization application can compute subjective scores having a level of overall accuracy that is increased relative to prior art techniques. These technical advantages provide one or more technological improvements over prior art approaches.

System Overview

FIG. 1 is a conceptual illustration of a system 100 configured to implement one or more aspects of the various embodiments. For explanatory purposes, multiple instances of like objects are denoted with reference numbers identifying the object and parenthetical alphanumeric character(s) identifying the instance where needed. As shown, the system 100 includes, without limitation, a compute instance 110 and a subjective quality experiment 102.

In some alternate embodiments, the system 100 can include, without limitation, any number of compute instances 110 and any number of subjective quality experiments 102 in any combination. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110 includes, without limitation, a processor 112 and a memory 116. The compute instance 110 can be implemented in a cloud computing environment, implemented as part of any other distributed computing environment, or implemented in a stand-alone fashion. In some alternate embodiments, each of any number of compute instances 110 can include, without limitation, any number of processors 112 and any number of memories 116 in any combination. Any number of compute instances 110 (including one) can provide a multiprocessing environment in any technically feasible fashion.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112. The memory 116 can be one or more of a readily available memory, such as random-access memory, read only memory, floppy disk, hard disk, or any other form of digital storage, local or remote.

In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

In general, the compute instance 110 is configured to implement one or more applications or subsystems of applications. For explanatory purposes only, each application is described as residing in the memory 116 of the compute instance 110 and executing on a processor 112 of the compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to mitigate scoring inaccuracies in the subjective quality experiment 102. The subjective quality experiment 102 can be any type of experiment that is conducted to understand the quality levels of digital items and/or digital services as perceived by consumers of the digital items and/or digital services. Some examples of digital items and services include, without limitation, images, music, movies, streaming services, websites, and cloud-based software.

During the subjective quality experiment 102, each of any number of participants 142 perform any number of tasks 132 in any combination. For example, the participant 142(1) could perform all of the tasks 132, while the participant 142(2) could perform half of the tasks 132. During or after performing a given task 132, the participant 142 assigns an individual score (not shown in FIG. 1) that ranks a quality-related aspect of the task 132.

The participants 142 can be recruited, trained, and deployed in any technically feasible fashion. As used herein, "deployed" refers to causing the participants 142 to perform the tasks 132 and assign the individual scores. For instance, in some embodiments, crowd-sourcing techniques are used to recruit, train, and deploy any number of the participants 142 at any number of remote locations (e.g., the homes of the participants 142). In the same or other embodiments, any number of the participants 142 can be deployed in any number of laboratories and/or other controlled settings.

Each of the tasks 132 is associated with a different digital item and/or digital service. A given task 132 can include, without limitation, any number and type of operations that enable the participants 142 to assess any quality-related aspect of the associated digital item and/or digital service in any technically feasible fashion. For instance, in some embodiments, the subjective quality experiment 102 is conducted to assess the visual quality levels of reconstructed video clips. During a setup phase associated with the subjective quality experiment 102, each of any number of source video clips are encoded repeatedly, at a variety of different resolutions and/or bitrates to generate encoded video clips. Subsequently, the encoded video clips are decoded to generate the reconstructed video clips.

The tasks 132 involve watching the reconstructed video clips on a display device, such as the screen of a laptop or a smart television, and personally rating the visual quality—assigning individual scores to the reconstructed video clips. The participants 142 can assess the visual quality of the reconstructed video clips and assign the individual scores in any technically feasible fashion and based on any type of rating system.

For instance, in some embodiments, the tasks 132 involve absolute category rating. Each of the participants 142 watches the reconstructed video clips one at a time and assigns an individual score that assess the overall visual quality to each of the reconstructed video clips independently. The participants 142 can assign the individual scores based on any type of consistent scale. For example, the individual scores could vary on a scale from 1 (visual quality is bad) to 5 (visual quality is excellent).

In some other embodiments, the tasks 132 involve degradation category rating. For each reconstructed video clip, each of the participants 142 watches both the corresponding source video clip and the reconstructed video clip and then assigns an individual score that rates the impairments perceived in the reconstructed video clip. The participants 142 can assign the individual scores based on any type of consistent scale. For example, the individual scores could vary on a scale from 1 (impairments are very annoying) to 5 (impairments are imperceptible).

As described previously herein, one problem associated with subjective quality experiments is that individual scores typically include inaccuracies that degrade the accuracy of subjective scores generated based on the individual scores. Typically, the subjective score associated with a given task estimates the score that an average person would assign to that task. In one conventional approach to mitigating scoring inaccuracies in subjective quality experiments, systematic inaccuracies associated with individual scores of the different participants are estimated and accounted for when determining a final subjective score for a given task.

One drawback of such an approach is that the accuracies associated with subjective scores can still be adversely impacted by random inaccuracies associated with individual scores of the different participants. To mitigate random scoring inaccuracies in subjective quality experiments, the number of participants in a subjective quality experiment can be increased. One drawback with this approach, though, is that the resources required to conduct the subjective quality experiment increases as the total number of participants in the subjective quality experiment increases. Furthermore, even when the number of participants in a subjective quality experiment is increased, random scoring accuracies can still prevent the subjective scores from having the appropriate or desired level of overall accuracy.

Evaluating the Performance of Participants Based on Subjective Factors

To address the above problems, the subjective quality experiment 102 is conducted across experiment rounds 120(1)-120(R), and the compute instance 110 includes, without limitation, the data optimization applications 160 (1)-160(R), where R can be any positive integer. For explanatory purposes only, the variable r is used herein to denote any integer from 1 to R, inclusively.

The experiment rounds 120(1)-120(R) are also referred to herein individually as the experiment round 120 and collectively as the experiment rounds 120. The experiment rounds 120 are conducted sequentially, starting with the experiment round 120(1) and ending with the experiment round 120(R). Each of the experiment rounds 120 can be conducted over any interval of time and any two sequential experiment rounds 120 can be separated by any interval of time.

As shown explicitly for the experiment rounds 120(1), 120(2), and 120(R), the experiment round 120(*r*) includes without limitation, an ancillary dataset 122(*r*), a task set 130(*r*), and a participant set 140(*r*). The ancillary dataset 122(*r*) can include, without limitation, any amount of data that is associated with the task set 130(*r*). For instance, in some embodiments, the ancillary dataset 122(1) includes, without limitation, reconstructed video clips and source video clips associated with the task set 130(1).

The task set 130(*r*) includes, without limitation, any number of the tasks 132. In some embodiments, each of the tasks 132 is included in each of the task sets 130(1)-130(R), and therefore the tasks sets 130(1)-130(R) are the same. In other embodiments, the tasks 132 are partitioned between the task sets 130(1)-130(R), and the tasks sets 130(1)-130 (R) are mutually exclusive subsets of the tasks 132. In the same or other embodiments, the number of the tasks 132 in each of the task sets 130(1)-130(R) can vary. In some embodiments, each of the tasks 132 can be included in any number of the task sets 130(1)-130(R), and the number of the tasks 132 in each of the task sets 130(1)-130(R) can vary.

The participant set 140(*r*) includes, without limitation, any number of the participants 142. The participant set 140(*r*) can differ from any number of the other participant sets 140. In some embodiments, the sizes of the participant sets 140(1)-140(R) are the same. In other embodiments, the sizes of the participant sets 140(1)-140(R) can vary.

Before the experiment round 120(1), an individual score tensor 150 that resides in the memory 116 is initialized to an empty tensor in any technically feasible fashion. During each of the experiment rounds 120(*r*), each of the participants 142 included in the participant set 140 performs and assigns an individual score to each of the tasks 132 included in the task set 130(*r*). For explanatory purposes only, the individual scores assigned during the experiment rounds 120(1)-120(R) are also referred to herein as the individual score datasets 148(1)-148(R), respectively. Each of the individual scores is a human assessment of a quality-related aspect of one of the tasks 132. For example, an individual score could represent, without limitation, a human assessment of visual quality for an image, audio quality for an audio clip, visual quality for a video clip, or quality of experience associated with a website.

In some alternate embodiments, each of the participants 142 included in the participant set 140(*r*) can perform and assign individual scores to any number of the tasks 132 included in the task set 130(*r*) during the experiment round 120(*r*). For example, during the experiment round 120(1), the participant 142(1) could perform and assign individual scores to the tasks 132(1)-132(5) but could ignore the tasks 132(6)-132(N). In the same or other alternate embodiments, any number of the participants 142 included in the participant set 140(*r*) repeatedly perform and assign individual scores to any number of tasks 132 during the experiment round 120(*r*), and the techniques described herein are modified accordingly. For example, during the experiment round 120(2), the participant 142(4) could perform the task 132(3) three times and assign three different individual scores to the task 132(3).

After each of the experiment rounds 120(R), the individual scores included in the individual score dataset 148(R) are added to the individual score tensor 150. The individual scores can be added to the individual score tensor 150 by any software application and/or user in any technically feasible fashion. In some alternate embodiments, the data optimization application 160 adds the individual scores to the individual score tensor 150. The individual score tensor 150 can organize the individual scores in any technically feasible fashion that indicates the task 132 and the participant 142 associated with each individual score.

In some embodiments, and as exemplified below in conjunction with FIG. 2, the individual score tensor 150 is a three dimensional tensor that includes, without limitation, any number of entries that are organized into rows, columns, and pages. In the individual score tensor 150, each row is associated with a different one of the participants 142, each column is associated with a different one of the tasks 132, and each page is associated with a different one of the experiment rounds 120. In some embodiments, the entry corresponding to the $i^{th}$ row, the $j^{th}$ column, and the $r^{th}$ page is either empty or corresponds to the subjective score assigned to the task 132(*j*) by the participant 142(*i*) during the experiment round 120(*r*).

For explanatory purposes only, FIG. 1 depicts multiple snapshots of the individual score tensor 150, where each snapshot is associated with a different point in time and a different experiment round 120. The snapshots of the individual score tensor 150 are denoted as the individual score tensors 150(1)-150(R). The individual score tensor 150(*r*) is associated with the experiment round 120(*r*) and includes, without limitation, the individual scores generated during the experiment rounds 120(1)-120(*r*).

In some alternate embodiments, the individual score tensor 150 can reside in any persistent memory. In the same or other alternate embodiments, the individual score tensor 150 can be replaced with number and/or types of data structures that store and/or organize the individual scores for the experiment rounds 120(1)-120(R) in any technically feasible fashion, and the techniques described herein are modified accordingly.

After the experiment round 120(*r*) and before conducting any subsequent experiment rounds 120, the data optimization application 160(*r*) generates an optimized subjective score set 180(*r*) and a participant evaluation report 190(*r*) based on the individual score tensor 150(*r*). The data optimization applications 160(1)-160(R) are different instances of a single software application, referred to herein as the data optimization application 160. The data optimization applications 160(1)-160(R) are also referred to herein individually as the data optimization application 160 and collectively as the data optimization applications 160.

Each of the data optimization applications 160(1)-160(R) resides in the memory 116 of the compute instance 110 and executes on the processor 112 of the compute instance 110. In some alternate embodiments, any number of the data optimization applications 160 can reside in the memories 116 of any number of the computer instances 110 and execute on the processors 112 of any number of compute instances 110 in any combination.

The data optimization application 160(*r*) can acquire the individual score tensor 150(*r*) in any technically feasible fashion. For instance, in some embodiments, a software application or a user can input the individual score tensor 150(*r*) into the data optimization application 160(*r*). In some other embodiments, the data optimization application 160(*r*) reads the individual score tensor 150(*r*) in response to any type of input command and/or a configuration file.

Figure 2:
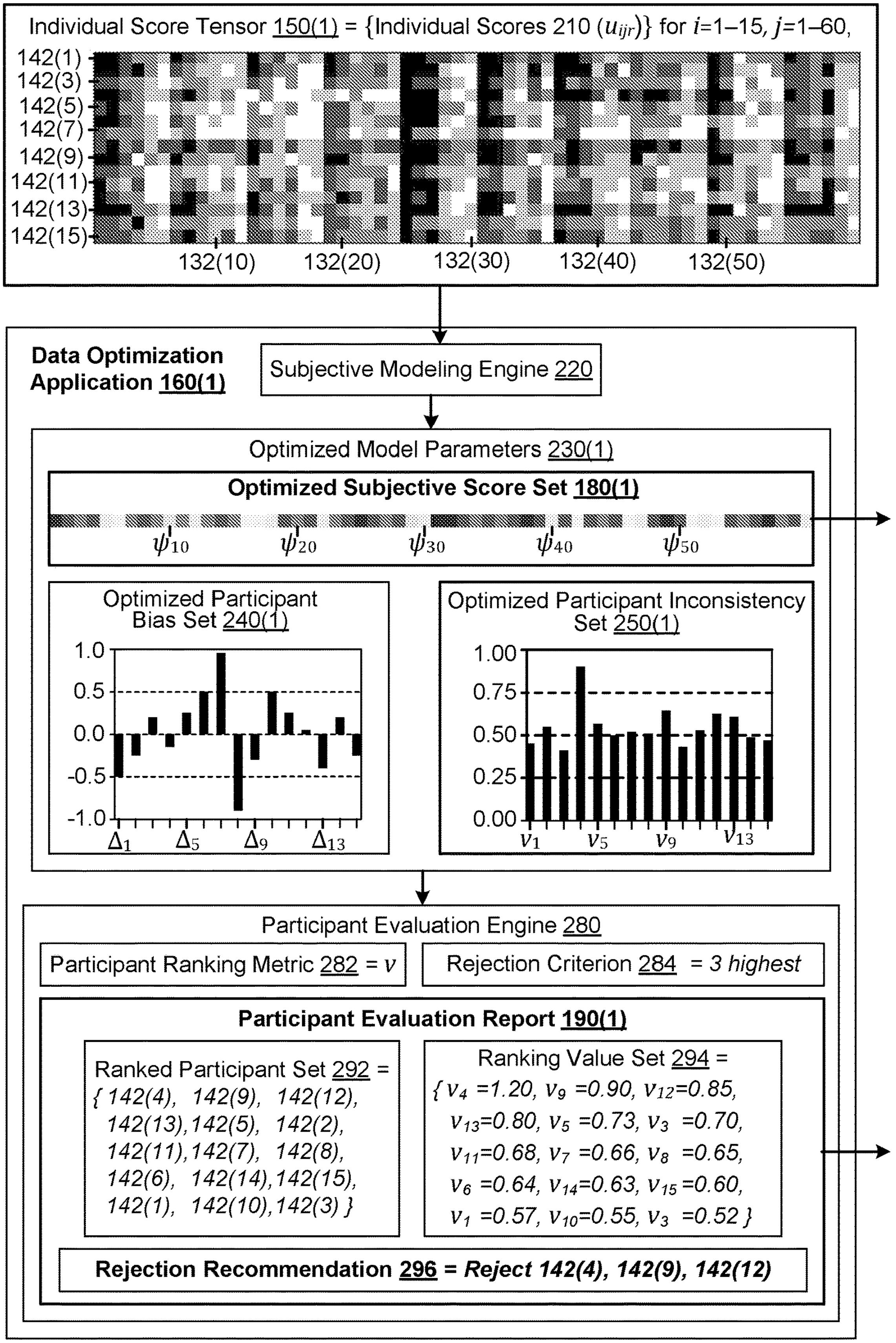
FIG. 2 is a more detailed illustration of the data optimization application of FIG. 1, according to various embodiments.

As described in greater detail in conjunction with FIG. 2, the data optimization application 160 includes, without limitation, a subjective modeling engine (not shown in FIG. 1) and a participant evaluation engine (not shown in FIG. 1). As described in greater detail in conjunction with FIG. 3, the subjective modeling engine jointly estimates the "true" subjective scores for the tasks 132 represented in the individual score tensor 150(*r*) and values for any number of subjective factors based on the individual scores included in the individual score tensor 150(*r*).

As referred to herein, the "true" subjective score of each of the tasks 132 is the individual score that would be assigned to the task 132 by a hypothetical consistent and unbiased person. For instance, in some embodiments, the task 132(*j*) involves watching a reconstructed video clip derived from an encoded video clip, and the true subjective score of the task 132(*j*) is a perceptual video quality score that estimates a quality level for the reconstructed video clip. In some alternate embodiments, the subjective modeling engine can estimate values for any type of quality-related metric instead of estimating the true subjective scores, and the techniques described herein are modified accordingly.

In some embodiments, the subjective modeling engine stores the estimated true subjective scores for the tasks 132 represented in the individual score tensor 150(*r*) as the optimized subjective score set 180(*r*). Accordingly, the optimized subjective score set 180(*r*) includes, without limitation, a different subjective score for each of the tasks 132 represented in the individual score tensor 150(*r*). In some alternate embodiments, the optimized subjective score set 180(*r*) includes, without limitation, a different subjective score for each of the tasks 132 included in the task set 130(*r*).

Each of the subjective factors can be any characteristic of the participants 142 or the tasks 132 that can lead to inaccuracies in the individual scores. In some embodiments, the subjective factors include, without limitation, participant biases and participant inconsistencies. In some alternate embodiments, the subjective factors include, without limitation, any number of participant biases, participant inconsistencies, and task ambiguities in any combination, and the techniques described herein are modified accordingly.

In an example of participant bias, the participants 142 that are relatively picky tend to assign lower individual scores than the participants 142 that are relatively undemanding. In an example of participant inconsistency, some of the participants 142 can be unable to maintain a consistent level of attentiveness while performing the tasks 132 and, consequently, assign individual scores in an inconsistent manner. In an example of task ambiguity, the task 132 of evaluating the quality of a reconstructed video clip that portrays a water surface that is rippling at nighttime is more difficult than the task 132 of evaluating the quality of a reconstructed video clip that portrays a bright blue sky.

In some embodiments, the subjective modeling engine stores the estimated participant biases associated with optimized subjective score set 180 in an optimized participant bias set (not shown in FIG. 1). In the same or other embodiments, the subjective modeling engine stores the estimated participant inconsistencies associated with optimized subjective score set 180 in an optimized participant inconsistency set (not shown in FIG. 1).

Because the subjective modeling engine analyzes the individual score tensor 150(*r*) in a comprehensive fashion, the optimized subjective score set 180(*r*) accurately accounts for systemic inaccuracies. Therefore, the subjective modelling engine effectively mitigates the impact of the participant biases on the optimized subjective score set 180(*r*).

As described in greater detail below in conjunction with FIG. 2, the participant evaluation engine generates the participant evaluation report 190(*r*) based on the estimated values for any number of the subjective factors generated by the subjective modeling engine. The participant evaluation report 190(*r*) includes, without limitation, any amount and/or type of data that can be used to determine and/or fine-tune the participant set 140(*r*+1) in order to reduce random inaccuracies associated with individual score tensors 150(*r*+1)-150(R). As persons skilled in the art will recognize, reducing the random inaccuracies associated with the individual score tensors 150(*r*+1)-150(R) increases the accuracy of the optimized subjective sets 180(*r*+1)-180(R).

In some embodiments, the participant evaluation engine generates the participant evaluation report 190(*r*) based on the optimized participant inconsistency set associated with the optimized subjective score set 180(*r*). The participant evaluation engine ranks the participants 142 associated with the individual score tensor 150(*r*) based on the optimized participant inconsistency set to generate a ranked participant set (not shown in FIG. 1). The participant evaluation engine then generates the participant evaluation report 190(*r*) based on the ranked participant set.

In some embodiments, the participant evaluation report includes, without limitation, any portions of any number of the ranked participant set, a ranking value set (not shown in FIG. 1), and a rejection recommendation (not shown in FIG. 1) in any combination. In some embodiments, the participant engine orders the optimized participant inconsistency set from highest to lowest to generate the ranking value set. In the same or other embodiments, the participant evaluation engine generates the rejection recommendation based on the ranked participant set and a rejection criterion (not shown in FIG. 1). For instance, in some embodiments, the rejection criterion is the three highest participant inconsistencies. The participant evaluation engine therefore generates the rejection recommendation that specifies the three participants 142 having the highest participant inconsistencies as per the ranked participant set.

In some alternate embodiments, the participant evaluation engine can rank any number of the participants 142 based on any number and/or types of subjective factors in any technically feasible fashion to generate the participant evaluation report 190(*r*). For instance, in some alternate embodiments, the participant evaluation engine ranks the participants 142 included in the experiment round 120(*r*) based on the optimized participant inconsistency set and the optimized participant bias set to generate the participant evaluation report 190(*r*).

As shown, the data optimization application 160(*r*) transmits the optimized subjective score set 180(*r*) and any portion of the participant evaluation report 190(*r*) to any number of software applications and/or any number of users. Subsequently, the participant evaluation report 190(*r*) can be used to filter-out any number of the participants 142 that are, relative to the other participants 142, associated with higher levels of random scoring variations For instance, in some embodiments, the participants 142 included in the rejection recommendation are filtered-out of the participant set 140(*r*) to generate the participant set 140(*r*+1). In the same or other embodiments, any number of the participants 142 are excluded from the participant set 140(*r*) based on the ranked participant set and, optionally, the ranking value set to generate the participant set 140(*r*+1). In some alternate embodiments, a predetermined number of the "best" participants 142 as per the ranked participant set are added to the participant set 140(*r*) in addition to a predetermined number of new participants 142.

In some embodiments, the subjective quality experiment 102 is terminated based, at least in part, on the subjective score set 180(*r*) and/or the participant evaluation report 190(*r*). For instance, in some embodiments, if none of the participant inconsistencies specified in the participant evaluation report 190(*r*) exceeds a maximum threshold, then the subjective quality experiment 102 is terminated.

For explanatory purposes only, exemplary values for the participant set 140(1), the task set 130(1), the participant set 140(2), the task set 130(2), the participant set 140(R), the task set 130(R) are depicted. As shown, the participant set 140(1) includes, without limitation, the participants 142(1)-142(M), where M can be any positive integer. For explanatory purposes only, the participants 142(1)-142(M) are symbolized as $P_1$-$P_M$ and the participant set 140(1) is denoted as $\{P_1$-$P_M\}$. Further, the participant 142 (*i*) for i is equal to any positive integer, is denoted as $P_i$.

The task set 130(1) includes, without limitation, the tasks 132(1)-132(N), where N can be any positive integer. For explanatory purposes only, the tasks 132(1)-132(N) are symbolized as $T_1$-$T_N$ and the task set 130(1) is denoted as $\{T_1$-$T_N\}$. Further, the task 132(*j*), where j can be any positive integer, is denoted as $T_j$.

As shown, the individual score tensor 150(1) has the dimensions of M×N×1, where M is the total number of rows, N is the total number of columns, and 1 is the total number of pages. The data optimization application 160(1) generates the optimized subjective score set 180(1) and the participant evaluation report 190(1) based on the individual score tensor 150(1). Although not shown in FIG. 1, the participant evaluation report 190(1) includes, without limitation, the rejection recommendation specifying to reject the participants 142(4), 142(9), and 142(12).

Based on the participant evaluation report 190(1), the participants 142(4), 142(9), and 142(12) are excluded from the participant set 140(2). Within the participant set 140(2), the participants 142(4) and 142(9) are superimposed with Xs to indicate that the participants 142(4) and 142(9) are excluded from the participant set 140(2). The participant 142(12) is not depicted within the participant set 140(2) and is therefore not superimposed with an X. Furthermore, the remaining participants 142 included in the participant set 140(1) are retained in the participant set 140(2) and the participants 142(M+1)-142(M+K), where K is any integer greater than 2, are added to the participant set 140(2), As shown, the task set 130(2) includes, without limitation, the tasks 132(2)-132(9), any number of the tasks 132(10)-132(N+P−1), and the task 132(N+P), where P is any positive integer. Because the individual score tensor 150(2) includes the individual scores included in both the individual score datasets 148(1) and 148(2), the individual score tensor 150(2) has the dimensions of (M+K)×(N+P)×2. The data optimization application 160(2) generates the optimized subjective score set 180(2) and the participant evaluation report 190(2) based on the individual score tensor 150(2).

Although not shown, the participant sets 142(3)-142(R−1) are determined, at least in part, based on the participant evaluation reports 190(2)-190(R−2), respectively. The participant set 140(R) is generated based on the participant set 140(R−1) and the participant evaluation report 190(R−1). As shown, the participant set 140(R) includes, without limitation, the participants 142(1)-142(3), the participants 142(6)-142(8), any number of the participants 142(10)-142(M+K−1), any number of the participants 142(M+K+1)-142(M+L−1), and the participant 142(M+L), where L can be any integer that is greater than K.

As shown, the task set 130(R) includes, without limitation, the tasks 132(2)-132(6), and any number of the tasks 132(8)-132(N+Q), where Q is any integer greater than P. Because the individual score tensor 150(R) includes, without limitation, the individual scores included in the individual score datasets 148(1)-148(R), the individual score tensor 150(R) has the dimensions of (M+L)×(N+Q)×R. The data optimization application 160(R) generates the optimized subjective score set 180(R) and the participant evaluation report 190(R) based on the individual score tensor 150(R).

Note that the techniques described herein are illustrative rather than restrictive and may be altered without departing from the broader spirit and scope of the invention. Many modifications and variations on the functionality provided by the data optimization application 160 will be apparent to those of ordinary skill in the art without departing from the scope and spirit of the described embodiments It will be appreciated that the system 100 shown herein is illustrative and that variations and modifications are possible. For instance, in some alternate embodiments, the data optimization application 160 can generate the participation evaluation reports 190(1)-190(R) based on any number and/or types of subjective factors. In the same or other alternate embodiments, the data optimization application 160 can be integrated into an overall experiment application.

Further, the connection topology between the various components in FIG. 1 may be modified as desired.

FIG. 2 is a more detailed illustration of the data optimization application 160 of FIG. 1, according to various embodiments. For explanatory purposes only, FIG. 2 describes the data optimization application 160(1) that generates the optimized subjective score set 180(1) and the participant evaluation report 190(1) based on the individual score tensor 150(1). As persons skilled in the art will understand, in some embodiments, the data optimization applications 160(2)-160(R) apply the techniques described in FIG. 2 to generate the subjective score sets 180(2)-180(R), respectively, and the participant evaluation reports 190(2)-190(R), respectively, based on the individual score tensors 150(2)-150(R), respectively.

Referring back to FIG. 1, the individual score tensor 150(1) represents the individual score dataset 148(1) generated during the experiment round 120(1). The individual score dataset 148(1) includes, without limitation, any number of individual scores 210 assigned by the participants 142(1)-142(M) to the tasks 132(1)-132(N) during the experiment round 120(1).

The individual score 210 assigned by the participant 142(*i*) to the task 132(*j*) during the experiment round 120(*r*) is symbolized herein as $u_{ijr}$. The individual score tensor 150(1) is symbolized herein as $\{u_{ijr}\}$, where the subscript i ranges from 1 to M, the subscript j ranges from 1 to N, and the subscript r is equal to 1.

For explanatory purposes only, FIG. 2 depicts an embodiment in which M is equal to 15 and N is equal to 60. Furthermore, each of the participants 142(1)-142(15) assigns a different individual score 210 to each of the tasks 132(1)-132(60). Consequently, the individual score tensor 150(1) includes, without limitation, 900 different individual scores 210.

The individual score tensor 150(1) is depicted as a 15×60 tensor where each row is associated with a different participant 142, and each column is associated with a different task 132. Each entry in the tensor visually corresponds to a different individual score 210 and is depicted as a shade of gray, where a darker shade indicates a lower individual score 210 and a lighter shade indicates a higher individual score 210.

As shown, the data optimization application 160(1) includes, without limitation, a subjective modeling engine 220, optimized model parameters 230(1), and a participant evaluation engine 280. As described in greater detail below in conjunction with FIG. 2, the subjective modeling engine 220 generates a model (not shown in FIG. 2) for the individual score tensor 150(1) that includes, without limitation, a subjective score set, a participant bias set, and a participant inconsistency set. In some alternate embodiments, the model parameters can include, without limitation, model parameters for the subjective scores and model parameters for any number and/or types of subjective factors instead of or in addition to the participant biases and/or the participant inconsistencies. The subjective modeling engine jointly optimizes the model parameters to generate the optimized model parameters 230(1).

As shown, in some embodiments, the optimized model parameters 230(1) include, without limitation, the optimized subjective score set 180(1), an optimized participant bias set 240(1), and an optimized participant inconsistency set 250(1). The optimized subjective score set 180(1) includes, without limitation, a different subjective score (not shown in FIG. 2) for each of the tasks 132(1)-132(60). The subjective score associated with the task 132(*j*) is symbolized herein as $\psi_j$. For explanatory purposes only, the subjective scores $\psi_1$-$\psi_{60}$ are depicted sequentially as entries in a single row tensor. Each entry depicts the corresponding subjective score as a shade of gray, where a darker shade indicates a lower subjective score and a lighter shade indicates a higher subjective score.

The optimized participant bias set 240(1) includes, without limitation, a different participant bias (not shown in FIG. 2) for each of the participants 142(1)-142(15). The participant bias associated with the participant 142(*i*) is symbolized herein as $\Delta_i$. For explanatory purposes only, the participant biases $\Delta_1$-$\Delta_{15}$ are depicted via a bar graph. The height of each bar along a vertical axis that ranges from −1.0 to 1.0 depicts the corresponding participant bias.

The optimized participant inconsistency set 250(1) includes, without limitation, a different participant inconsistency (not shown in FIG. 2) for each of the participants 142(1)-142(15). The participant inconsistency associated with the participant 142(*i*) is symbolized herein as $v_i$. For explanatory purposes only, the participant inconsistencies $v_1$-$v_{15}$ are depicted via a bar graph. The height of each bar along a vertical axis that ranges from 0 to 1.00 depicts the corresponding participant bias.

The participant evaluation engine 280 generates the participant evaluation report 190(1) based on the optimized model parameters 230(1). As shown, in some embodiments, the participant evaluation engine 280 includes, without limitation, a participant ranking metric 282, the participant evaluation report 190(1), and a rejection criterion 284.

The participant ranking metric 282 can be any metric associated with any aspect of the performance of the participants 142 that is a function of the optimized model parameters 230(1). In some embodiments, because the optimized subjective score set 180(1) compensates for systemic inaccuracies, the participant ranking metric 282 is defined based on subjective factors that are associated with random inaccuracies. As depicted in italics, in some embodiments, the participant ranking metric 282 is the participant inconsistency (denoted herein as v). In some alternate embodiments, the participant ranking metric 282 is specified as a weighted combination of any number of the subjective factors, such as the participant inconsistency and the participant bias.

For each of the participants 142 represented in the individual score tensor 150(1), the participant evaluation engine 280 computes a value for the participant ranking metric 282. A value for the participant ranking metric 282 is also referred to herein as a "ranking value." The participant evaluation engine 280 then generates the participant evaluation report 190(1) based on the rejection criterion 284 and the ranking values for the participants 142 represented in the individual score tensor 150(1).

The rejection criterion 284 can specify any number and/or types of conditions, comparisons, computations, etc., for recommending any number of the participants 142 for rejection. In some embodiments, the rejection criterion 284 is specified as a total number of the participants 142 that are associated with either the highest or the lowest ranking values. For instance, and as depicted in italics, in some embodiments, the rejection criterion 284 is the participants 142 associated with the three highest ranking values. In some embodiments, the rejection criterion 284 is specified as a threshold with respect to the participant ranking metric 282. For example, the rejection criterion 284 could specify a maximum acceptable value of the participant ranking metric 282.

The participant evaluation report 190(1) includes, without limitation, a ranked participant set 292, a ranking value set 294, and a rejection recommendation 296. The participant evaluation engine 280 ranks the participants 142 associated with the individual score tensor 150(1) based on the corresponding ranking values to generate the ranked participant set 292 and the ranking value set 294. The participant evaluation engine 280 can rank the participants 142 based on the associated ranking values in any technically feasible fashion.

As shown, the ranked participant set 292 includes, without limitation, the participants 142(1)-142(15) ranked from the highest ranking value to the lowest ranking value. In a complementary fashion, the ranking value set 294 includes, without limitation, the ranking values from highest to lowest. Accordingly, the $x^{th}$ participant included in the ranked participant set 292 is associated with the $x^{th}$ entry in the ranking value set 294. In some alternate embodiments, the participant evaluation engine 280 can store the ranked ranking values in any number and/or type of data structure(s) and in any order (e.g., from lowest to highest).

For explanatory purposes only, FIG. 1 depicts, in italics, exemplary sets of entries for the ranked participant set 292 and the ranking value set 294 corresponding to exemplary values for the optimized model parameters 230(1). As shown, the ranked participant set 292 includes, without limitation, the participants 142(1)-142(15) in the following order: 142(4), 142(9), 142(12), 142(13), 142(5), 142(2), 142(11), 142(7), 142(8), 142(6), 142(14), 142(15), 142(1), 142(10), and 142(3).

Because the participant ranking metric 282 is the participant inconsistency, the ranking value set 294 includes, without limitation, the participant inconsistencies $v_1$-$v_{15}$ in the following order: $v_4$=1.20, $v_9$=0.90, $v_{12}$=0.85, $v_{13}$=0.80, $v_5$=0.73, $v_3$=0.70, $v_{11}$=0.68, $v_7$=0.66, $v_8$=0.65, $v_6$=0.64, $v_{14}$=0.63, $v_{15}$=0.60, $v_1$=0.57, $v_{10}$=0.55, and $v_3$=0.52.

The participant evaluation engine 280 generates the rejection recommendation 296 based on the ranking values and the rejection criterion 284 in any technically feasible fashion. For instance, in some embodiments the participant evaluation engine 280 generates the rejection recommendation 296 based on the ranked participant set 292, the ranking value set 294, and the rejection criterion 284. As shown, based on an exemplary value for the rejection criterion 284 of the highest three ranking values, the participant evaluation engine 280 generates the rejection recommendation 296 that recommends rejecting the participants 142(4), 142(9), and 142(12).

In some alternate embodiments, the participant evaluation engine 280 can generate any type of data associated with any type of participant ranking metric 282 in any technically feasible fashion based on any portion of the optimized model parameters 230. For instance, in some alternate embodiments, the participant evaluation engine 280 generates the ranking values and/or the rejection recommendation 296 based on the participants 142 that are included in the experiment round 120(*r*) instead of the individual score tensor 150(*r*).

Notably, because the participant biases are associated with systemic inaccuracies, the subjective modeling engine 220 compensates for the participant biases when generating the optimized subjective score set 180(1). For this reason, in some embodiments, including the embodiment described in FIG. 2, the participant ranking metric 282 is not a function of the participant biases. For example, referring back to the optimized participant bias set 240(1), the participant 142(7) that is associated with the highest participant bias $\Delta_7$ is not included in the rejection recommendation 296.

Modeling and Optimizing Subjective Scores and Subjective Factors

Figure 3:
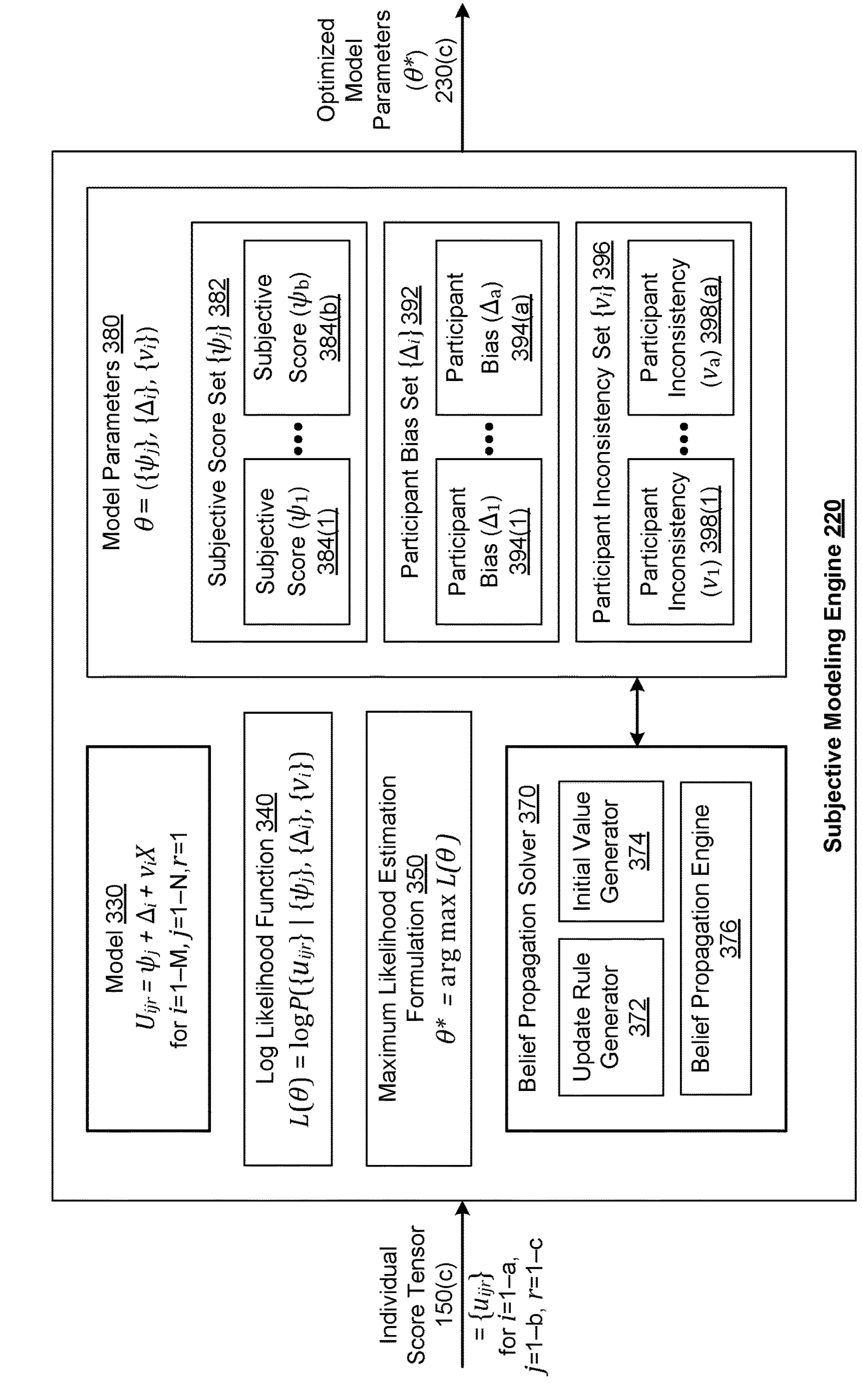
FIG. 3 is a more detailed illustration of the subjective modeling engine of FIG. 1, according to various embodiments.

FIG. 3 is a more detailed illustration of the subjective modeling engine 220 of FIG. 2, according to various embodiments. In FIG. 3, the subjective modeling engine 220 is described in the context of generating the optimized model parameters 230(*c*) based on the individual score tensor 150(*c*), where c can be any integer from 1 to R.

The individual score tensor 150(*c*) includes, without limitation, a×b×c entries, where a is the total number of different participants 142 across the experiment rounds 120(1)-120(*c*), b is the total number of different tasks 132 across the experiment rounds 120(1)-120(*c*), and c is the total number of the experiment rounds 120 that have been conducted.

As described previously herein in conjunction with FIG. 2, the individual score 210 assigned by the participant 142(*i*) to the task 132(*j*) during the experiment round 120(*r*) is symbolized as $u_{ijr}$. Each of the entries included in the individual score tensor 150(*c*) is either the corresponding individual score 210 or an empty entry. The individual score tensor 150(*c*) can include any number of empty entries for any number of reasons.

In some embodiments, an empty entry in the $i^{th}$ row, the $j^{th}$ column, and the $r^{th}$ page of the individual score tensor 150 indicates that the participant 142(*i*) did not provide a score for the task 132(*j*) during the experiment round 120(*r*). In particular, for the experiment round 120(*r*), where r is any integer between 2 and c, if the participant set 140(*r*) differs from the participant set 140(*r*−1) and/or the task set 130(*r*) differs from the task set 130(*r*−1), then the individual score tensor 150(*c*) includes at least one empty entry.

In the same or other embodiments, each of the experiment rounds 120 corresponds to a full sampling process or a selective sampling process. If the experiment round 120(*r*) corresponds to a full sampling process, then each of the participants 142 included in the participant set 140(*r*) assigns a different individual score 210 to each of the tasks 132 included in the task set 130(*r*). If, however, the experiment round 120(*r*) corresponds to a selective sampling process, then one or more of the participants 142 included in the participant set 140(*r*) does not assign individual scores 210 to one or more of the tasks 132 included in the task set 130(*r*). As a result of the selective sampling process, the individual score tensor 150(*c*) includes at least one empty entry.

Notably. In the context of FIG. 3, all operations (e.g., summations, loops, etc.) that involve the individual scores 210 included in the individual score tensor 150(*c*) exclude any empty entries. For example, using * to denote empty entries, $\Sigma_{ijr}$ is equivalent to $\Sigma ijr{:}u_{ijr\neq *}$. In another example, for the task 132(*j*), $\Sigma_{ir}$ 1 denotes the total number of the individual scores 210 that have been assigned to the task 132(*j*).

Note that the techniques described herein are illustrative rather than restrictive and may be altered without departing from the broader spirit and scope of the embodiments. Further, many modifications and variations on the functionality provided by the data optimization application 160, the participant evaluation engine 280, the subjective modeling engine 220 will be apparent to those of ordinary skill in the art without departing from the scope and spirit of the described embodiments. For instance, in some embodiments, any number of the participants 142 can assign multiple individual scores 210 to each of any number of the tasks 132 in the experiment round 120($r$), and the techniques described herein are modified accordingly.

As shown, the subjective modeling engine 220 includes, without limitation, a model 330, a log likelihood function 340, a maximum likelihood estimation formulation 350, a belief propagation solver 370, and model parameters 380. Upon receiving the individual score tensor 150($c$), the subjective modeling engine 220 generates the model 330 for the individual scores 210 included in the individual score tensor 150($c$).

The model 330 includes, without limitation, the model parameters 380 that are symbolized herein as θ. As shown, in some embodiments, the model parameters 380 include, without limitation, a subjective score set 382, a participant bias set 392, and a participant inconsistency set 396.

In some alternate embodiments, the model parameters 380 can include, without limitation, the subjective score set 382 and any number and/or types of subjective factors associated with the participants 142 and/or the tasks 132 in any combination. For instance, in some alternate embodiments, the model parameters 380 include, without limitation, the subjective score set 382, the participant bias set 392, the participant inconsistency set 396, and a task ambiguity set (not shown). The task ambiguity set estimates, without limitation, a different task ambiguity for each of the tasks 132.

The subjective score set 382 includes, without limitation, subjective scores 384(1)-384($b$). The subjective scores 384(1)-384($b$) are associated with the tasks 132(1)-142($b$), respectively. In some embodiments, the subjective score 384($j$) estimates the individual score 210 that would be assigned to the task 132($j$) by a hypothetical consistent and unbiased person. For instance, in some embodiments, each of the subjective scores 384 estimates the true subjective visual quality of a different reconstructed video clip. As noted previously herein in conjunction with FIG. 2, the subjective score 384($j$) associated with the task 132($j$) is symbolized herein as $\psi_j$.

As shown, the participant bias set 392 includes, without limitation, participant biases 394(1)-394($a$). The participant biases 394(1)-394($a$) estimate the biases of the participants 142(1)-142($a$), respectively. As noted previously herein in conjunction with FIG. 2, the participant bias 394($i$) associated with the participant 142($i$) is symbolized herein as $\Delta_i$.

The participant inconsistency set 396 includes, without limitation, participant inconsistencies 398(1)-398($a$). The participant inconsistencies 398(1)-398($a$) estimate the inconsistencies of the participants 142(1)-142($a$), respectively. As noted previously herein in conjunction with FIG. 2, the participant inconsistency 398($i$) associated with the participant 142($i$) is symbolized herein as $v_i$.

As shown, in some embodiments, the subjective modeling engine 220 generates the model 330 that represents each individual score $u_{ijr}$ as a random variable $U_{ijr}$ using equation (1):

$$U_{ijr} = \psi_j + \Delta_i + v_i X \tag{1}$$

In equation (1), X~N(0,1) are independent and identically distributed ("i.i.d") Gaussian random variables.

After generating the model 330, the subjective modeling engine 220 solves for the unknowns in equation (1). The unknowns in equation (1) are the model parameters 380 and are symbolized herein as $\theta=(\{\psi_j\}, \{\Delta_i\}, \{v_i\})$. In general, the subjective modeling engine 220 derives a solution for the model 330 that optimizes the likelihood that the subjective scores 384(1)-384($b$) compensate for the participant biases 394(1)-394($a$) and the participant inconsistencies 398(1)-398($a$). The solution includes, without limitation, values for the model parameters 380 that are referred to herein as the optimized model parameters 230($c$) and are symbolized as θ*. The subjective modeling engine 220 can compute the optimized model parameters 230($c$) in any technically feasible fashion.

In some embodiments, to compute the optimized model parameters 230($c$), the belief propagation solver 370 derives a solution for the maximum likelihood estimation formulation 350 of the model 330. As shown, the maximum likelihood estimation formulation 350 can be expressed as equation (2):

$$\theta^* = \arg\max L(\theta) \tag{2}$$

In equation (2), L(θ) denotes the log likelihood function 340. The log likelihood function 340 can be expressed as equation (3):

$$L(\theta) = \log P(\{u_{ijr}\}|\{\psi_j\}, \{\Delta_i\}, \{v_i\}) \tag{3}$$

As shown, the belief propagation solver 370 includes, without limitation, an update rule generator 372, an initial value generator 374, and a belief propagation engine 376.

In some embodiments, the update rule generator 372 simplifies the log likelihood function 340 based on an independence assumption of the individual scores 210 as per equations (4a)-(4b):

$$L(\theta) = \log \prod_{ijr} P(u_{ijr}|\psi_j, \Delta_i, v_i) \tag{4a}$$

$$L(\theta) = \sum_{ijr} \log P(u_{ijr}|\psi_j, \Delta_i, v_i) \tag{4b}$$

The update rule generator 372 then applies a Gaussian formula with omission of the constant terms to further simplify the log likelihood function 340 as per equations (4c)-(4d):

$$L(\theta) = \sum_{ijr} \log f(u_{ijr} \mid \psi_j + \Delta_i, v_i) \tag{4c}$$

$$L(\theta) \cong \sum_{ijr} -\log v_i - \frac{(u_{ijr} - \psi_j - \Delta_i)^2}{2v_i^2} \tag{4d}$$

As used in equation (4c), $f(x|\mu, v)$ is the Gaussian density function with mean μ and standard deviation v. In equation (4d), ≅ denotes equal with omission of constant terms.

Subsequently, the update rule generator 372 derives and expresses the first-order derivatives for the log likelihood function 340 with respect to the subjective scores 384(1)-384($b$), the participant biases 394(1)-394($a$), and the participant inconsistencies 398(1)-398($a$) as equations (5a)-(5c), respectively:

$$\frac{\partial L(\theta)}{\partial \psi_j} = \sum_{ir} \frac{u_{ijr} - \psi_j - \Delta_i}{v_i^2} \tag{5a}$$

-continued $$\frac{\partial L(\theta)}{\partial \Delta_i} = \sum\nolimits_{jr} \frac{u_{ijr} - \psi_j - \Delta_i}{v_i^2} \tag{5b}$$

$$\frac{\partial L(\theta)}{\partial v_i} = \sum\nolimits_{jr} -\frac{1}{v_i} + \frac{(u_{ijr} - \psi_j - \Delta_i)^2}{v_i^3} \tag{5c}$$

The update rule generator 372 then derives and expresses the second-order derivatives for the log likelihood function 340 with respect to the subjective scores 384(1)-384(*b*), the participant biases 394(1)-394(*a*), and the participant inconsistencies 398(1)-398(*a*) as equations (6a)-(6c), respectively:

$$\frac{\partial^2 L(\theta)}{\partial \psi_j^2} = -\sum\nolimits_{ir} \frac{1}{v_i^2} \tag{6a}$$

$$\frac{\partial^2 L(\theta)}{\partial \Delta_i^2} = -\frac{1}{v_i^2} \sum\nolimits_{jr} 1 \tag{6b}$$

$$\frac{\partial^2 L(\theta)}{\partial v_i^2} = \sum\nolimits_{jr} \frac{1}{v_i^2} - \frac{3(u_{ijr} - \psi_j - \Delta_i)^2}{v_i^4} \tag{6c}$$

The update rule generator 372 applies the Newton-Raphson update rule in conjunction with the equations (5a)-(5c) and the equations (6a)-(6c) to generate update rules (not shown) for the model parameters 380. The Newton-Raphson update rule for a parameter a can be expressed as equation (7):

$$a^{new} \leftarrow a - \frac{\partial L / \partial a}{\partial^2 L / \partial a^2} \tag{7}$$

Accordingly, the update rules for the model parameters 380 can be expressed as equations (8a)-(8c):

$$\psi_j^{new} = \frac{\sum_{ir} v_i^{-2}(u_{ijr} - \Delta_i)}{\sum_{ir} v_i^{-2}} \tag{8a}$$

$$\Delta_i^{new} = \frac{\sum_{jr} (u_{ijr} - \psi_j)}{\sum_{jr} 1} \tag{8b}$$

$$v_i^{new} = v_i \frac{\sum_{jr} 2v_i^2 - 4(u_{ijr} - \psi_j - \Delta_i)^2}{\sum_{jr} v_i^2 - 3(u_{ijr} - \psi_j - \Delta_i)^2} \tag{8c}$$

The initial value generator 374 included in the belief propagation solver 370 computes initial values for the model parameters 380. The initial value generator 374 can compute the initial values for the model parameters 380 in any technically feasible fashion.

In some embodiments, for the tasks 132(1)-132(*b*), the initial value generator 374 sets initial values for the subjective scores 384(1)-384(*b*), respectively, equal to the corresponding mean opinion scores. For the task 132(*j*) the initial value generator 374 computes the corresponding mean opinion score as the average of the associated individual scores 210. The mean opinion score for the task 132(*j*) is denoted herein $MOS_j$ and can be expressed as equation (9):

$$MOS_j = \left(\sum\nolimits_{ir} 1\right)^{-1} \sum\nolimits_{ir} u_{ijr} \tag{9}$$

In some other embodiments, for each of the participant biases 394(1)-394(*a*), the initial value generator 374 sets a corresponding initial value equal to zero. In the same or other embodiments, the initial value generator 374 sets the initial values for the participant inconsistencies 398(1)-398(*a*) equal to residual standard deviations associated with the participants 142(1)-142(*a*), respectively. The residual standard deviation associated with the participant 142(*i*) is denoted herein $RSD_i$ and can be expressed using equations (10a)-(10d):

$$RSD_i = \sigma_i(\{\varepsilon_{ijr}\}) \tag{10a}$$

$$\varepsilon_{ijr} = u_{ijr} - MOS_j \tag{10b}$$

$$\sigma_i(\{\varepsilon_{ijr}\}) = \sqrt{\left(\sum\nolimits_{jr} 1\right)^{-1} \sum\nolimits_{jr} (\varepsilon_{ijr} - \varepsilon_i)^2 - \varepsilon_i^2} \tag{10c}$$

$$\varepsilon_i = \left(\sum\nolimits_{jr} 1\right)^{-1} \sum\nolimits_{jr} \varepsilon_{ijr} \tag{10d}$$

In some embodiments, the belief propagation engine 376 implements a belief propagation algorithm (not shown) to derive the solution for the maximum likelihood estimation formulation 350. The belief propagation engine 376 iteratively updates the model parameters 380 until satisfying a "stop threshold" that indicates that a sufficient level of convergence or optimization has been reached. The belief propagation algorithm includes, without limitation, an input phase, an initialize phase, a loop phase, and an output phase.

During the input phase, the belief propagation engine 376 receives the individual score tensor 150(*c*), sets a refresh rate, and sets a stop threshold. The refresh rate correlates to the magnitude of the updates to the model parameters 380, and consequently the rate at which the belief propagation engine 376 approaches the solution. The stop threshold specifies a rate of convergence that correlates to an acceptable accuracy for the solution. The belief propagation engine 376 can be configured to implement any refresh rate and stop threshold. For instance, in some embodiments, the belief propagation engine 376 sets the refresh rate to 0.1 and the stop threshold to 1e-9.

During the initialize phase, the belief propagation engine 376 sets the model parameters 380 equal to the corresponding initial values. As previously described herein, in some embodiments, the initial value generator 374 computes the initial values. During the loop phase, the belief propagation engine 376 applies the update rules for the model parameters 380 to the model parameters 380.

As previously described, in some embodiments, the update rule generator 372 computes the update rules for the model parameters 380 based on the equations (8a)-(8c). The belief propagation engine 376 iteratively applies the update rules for the model parameters 380 to the model parameters 380 until the belief propagation engine 376 determines that the stop threshold has been reached. In the output phase, the belief propagation engine 376 identifies the updated model parameters 380 as the model parameters 380 of the solution.

After the belief propagation engine 376 finishes executing, the subjective modeling engine 220 sets the optimized model parameters 230($c$) equal to the model parameters 380 of the solution. In some embodiments, the subjective modeling engine 220 sets the optimized subjective score set 180($c$), the optimized participant bias set 240($c$), and the optimized participant inconsistency set 250($c$) equal to the subjective score set 382, the participant bias set 392, and the participant inconsistency set 396, respectively. Advantageously, the subjective scores 384(1)-384($b$) included in the optimized subjective score set 180($c$) can accurately compensate for the participant biases 394(1)-394($a$) included in the optimized participant bias set 240($c$).

Note that the techniques described herein are illustrative rather than restrictive and may be altered without departing from the broader spirit and scope of the embodiments. Further, many modifications and variations on the functionality provided by the subjective modeling engine 220, the update rule generator 372, the initial value generator 374, and the belief propagation engine 376 will be apparent to those of ordinary skill in the art without departing from the scope and spirit of the described embodiments. Some alternate embodiments can include any type of subjective modeling application that improves the accuracy of any type of subjective data in any field based on jointly estimating any type of "true" subjective scores and any number of subjective factors.

In some alternate embodiments, the model parameters 380 can represent any number and/or types of subjective factors in any combination. In some alternate embodiments, the subjective modeling engine 220 can implement any type of optimization criterion instead of the maximum likelihood estimation formulation 350. In that same or other alternate embodiments, the update rule generator 372 can derive update rules for the model parameters 380 based on any technically feasible update rule instead of the Newton-Raphson update rule. In the same or other alternate embodiments, the initial value generator 374 can generate initial values for the model parameters 380 in any technically feasible fashion.

In some alternate embodiments, the subjective modeling engine 220 can derive a solution for the maximum likelihood estimation formulation 350 using any technique as known in the art instead of the belief propagation algorithm. For instance, in some embodiments, the subjective modeling engine 220 executes an alternating projection solver on the maximum likelihood estimation formulation 350 to derive a solution for the maximum likelihood estimation formulation 350. In a loop, the alternating projection solver alternates between projecting (or averaging) the individual scores 210 included in the individual score tensor 150($c$) along the participant 142 dimension and the task 132 dimension.

Figure 4:
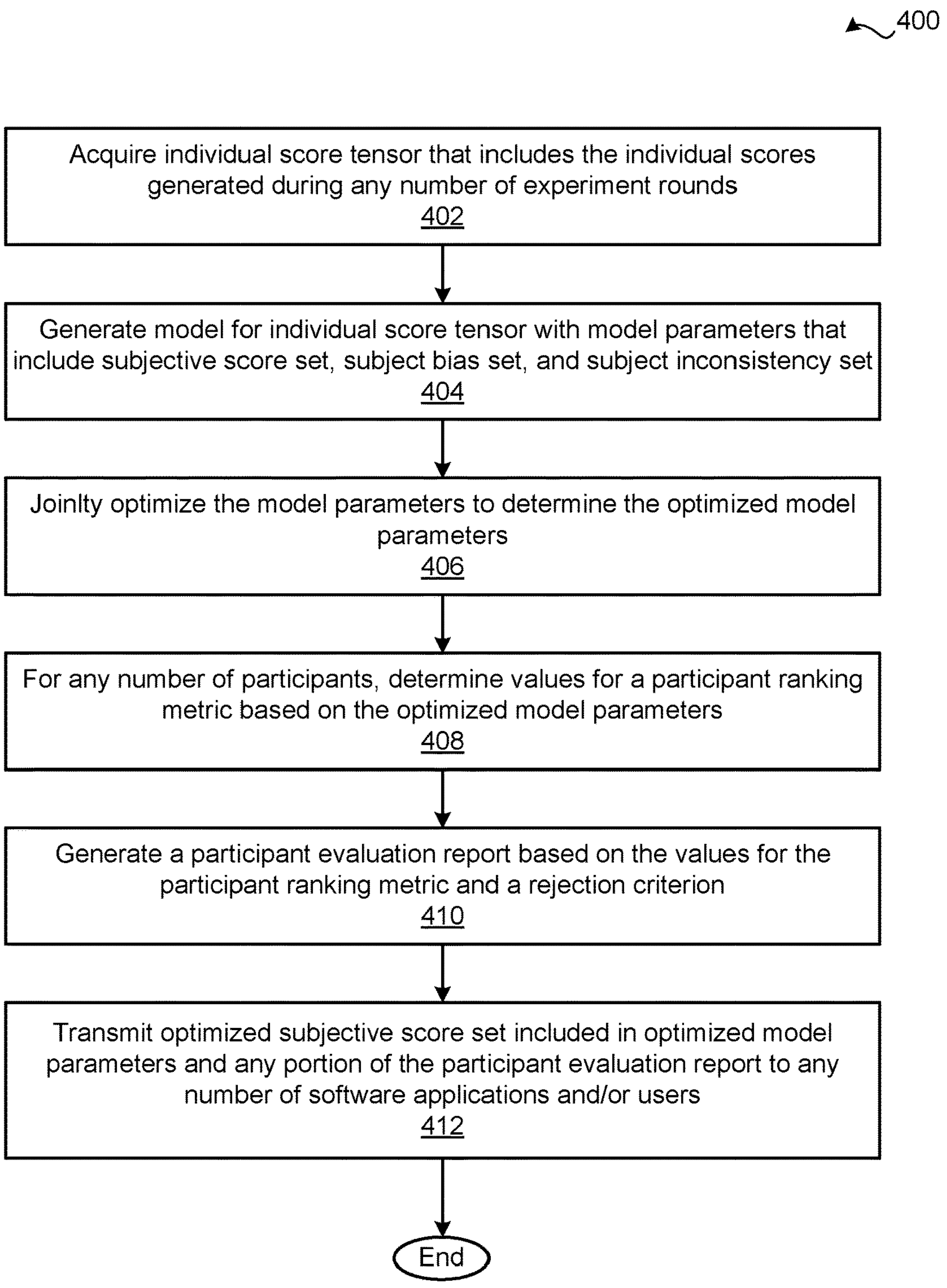
FIG. 4 is a flow diagram of method steps for mitigating scoring inaccuracies in subjective quality experiments, according to various embodiments.

FIG. 4 is a flow diagram of method steps for mitigating scoring inaccuracies in subjective quality experiments, according to various embodiments. Although the method steps are described with reference to the systems of FIGS. 1-3, persons skilled in the art will understand that any system configured to implement the method steps, in any order, falls within the scope of the embodiments.

As shown, a method 400 begins at step 402, where the data optimization application 160 acquire the individual score tensor 150 that includes, without limitation, the individual scores 210 generated during any number of the experiment rounds 120. At step 404, the subjective modeling engine 220 generates the model 330 for the individual score tensor 150. In some embodiments, the model 330 includes the model parameters 380 representing, without limitation, the subjective score set 382, the participant bias set 392, and the participant inconsistency set 396. At step 406, the subjective modeling engine 220 jointly optimizes the model parameters 380 to determine the optimized model parameters 230.

At step 408, for any number of the participants 142, the participant evaluation engine 280 determines values for the participant ranking metric 282 based on the optimized model parameters 230. At step 410, the participant evaluation engine 280 generates the participant evaluation report 190 based on the values for the participant ranking metric 282 and the rejection criterion 284. At step 412, the participant evaluation engine 280 transmits the optimized subjective score set 180 and any portion of the participant evaluation report 190 to any number of software applications and/or users. The method 400 then terminates.

In the subjective quality experiment 102, the steps 402-412 are repeated after the individual scores 210 generated during each of the experiment rounds 120 are added to the individual score tensor 150. Based on the participant evaluation report 190($r$), the participant set 140($r$+1) can be fine-tuned to increase the accuracy of the optimized subjective score sets 180($r$+1)-180(R).

In sum, the disclosed techniques may be used to mitigate both systemic inaccuracies and random scoring inaccuracies in subjective quality experiments. In some embodiments, a subjective quality experiment is conducted in sequential experiment rounds, where each experiment round is associated with a different set of participants and a set of tasks. Initially, an individual score tensor that stores the individual scores generated during the subjective quality experiment is set to an empty tensor. During an experiment round, the associated set of participants assigns individual scores based on the set of tasks. After the experiment round, the individual scores generated during the experiment round are added to the individual score tensor. The individual score tensor is then inputted into a data optimization application.

The data optimization application includes, without limitation, a subjective modeling engine and a participant evaluation engine. The subjective modeling engine generates a model for the individual score tensor that includes, without limitation, model parameters for per-task subjective scores in addition to model parameters for subjective factors. The subjective factors include, without limitation, participant biases and participant inconsistencies. The subjective modeling engine then generates a maximum likelihood estimation formulation of the model based on a log maximum likelihood function. Subsequently, the subjective modeling engine executes a belief propagation algorithm to derive a solution for the maximum likelihood estimation formulation of the model. The solution includes, without limitation, optimized subjective scores, optimized participant biases, and optimized participant inconsistencies.

The participant evaluation engine ranks the participants in the most recent experiment round based on the associated participant inconsistencies from the highest participant inconsistency to the lowest participant inconsistency to generate a ranked participant set. The participant evaluation engine also generates a ranking value set that specifies the highest participant inconsistency to the lowest participant inconsistency. Based on the ranked participant set, the ranking value set, and a rejection criteria, the participant evaluation engine generates a rejection recommendation. The participant evaluation engine generates a participant evaluation report that includes, without limitation, the ranked participant set, the ranking value set, and the rejection recommendation.

The data optimization application transmits the optimized subjective scores and any portion of the participant evaluation report to any number of users and/or any number and/or types of software applications. Based on the optimized subjective scores and the participant evaluation report, the subjective quality experiment can be terminated, or another experiment round can be conducted. If another experiment round is conducted, then the set of participants can be adjusted based on the participant evaluation report. For example, any number of the participants could be excluded from the next experiment round based on the rejection recommendation.

At least one technical advantage of the disclosed techniques relative to the prior art is that the data optimization application can mitigate both systematic and random inaccuracies associated with the individual scores. Consequently, the accuracy of the subjective scores included in the final optimized subjective score set is increased. More specifically, the subjective modeling engine compensates for systematic inaccuracies and quantifies random inaccuracies when generating each of the optimized subjective score sets. By automatically generating the participant evaluation report based on the optimized subjective factor set(s) that quantify the random inaccuracies, the participant evaluation engine enables the random inaccuracies associated with the subjective quality experiment to be reduced via participant screening. As a result, the accuracy of the subjective scores included in the final optimized subjective score set can be increased without unnecessarily increasing the total number of participants in the subjective quality experiment. These technical advantages provide one or more technological improvements over prior art approaches.

1. In some embodiments, a computer-implemented method for mitigating scoring inaccuracies in subjective quality experiments comprises generating a model that includes a plurality of individual scores and a first plurality of parameters, wherein the first plurality of parameters includes a first subjective score set and a first plurality of subjective factor sets, performing one or more optimization operations on the first plurality of parameters to generate a second plurality of parameters that includes a second subjective score set and a second plurality of subjective factor sets, wherein the second subjective score set compensates for at least a first subjective factor set included in the second plurality of subjective factor sets, and computing a participant evaluation report based on at least a second subjective factor set included in the second plurality of subjective factor sets.

2. The computer-implemented method of clause 1, wherein the first subjective factor set comprises a participant bias set, and the second subjective factor set comprises a participant inconsistency set.

3. The computer-implemented method of clauses 1 or 2, wherein the second subjective factor set includes a different participant inconsistency for each participant that is associated with the plurality of individual scores.

4. The computer-implemented method of any of clauses 1-3, wherein computing the participant evaluation report comprises ranking a plurality of participants associated with the plurality of individual scores based on the at least the second subjective factor set to determine a ranked participant set, and generating the participant evaluation report based on the ranked participant set.

5. The computer-implemented method of any of clauses 1-4, wherein the participant evaluation report comprises a rejection recommendation that specifies at least one participant associated with the plurality of individual scores.

6. The computer-implemented method of any of clauses 1-5, wherein performing the one or more optimization operations comprises generating a maximum likelihood estimation formulation of the model based on a log maximum likelihood function.

7. The computer-implemented method of any of clauses 1-6, further comprising executing a belief propagation algorithm on the maximum likelihood estimation formulation.

8. The computer-implemented method of any of clauses 1-7, wherein a first individual score included in the plurality of individual scores represents an assessment of visual quality for a reconstructed video clip derived from an encoded video clip.

9. The computer-implemented method of any of clauses 1-8, wherein the second subjective score set includes a perceptual video quality score that estimates the visual quality of the reconstructed video clip as perceived by a hypothetical consistent and unbiased subject.

10. The computer-implemented method of any of clauses 1-9, wherein a first individual score included in the plurality of individual scores represents an assessment of visual quality for an image, audio quality for an audio clip, or quality of experience associated with a website.

11. In some embodiments, one or more non-transitory computer readable media include instructions that, when executed by one or more processors, cause the one or more processors to mitigate scoring inaccuracies in subjective quality experiments by performing the steps of generating a model for a plurality of individual scores that includes a first subjective score set and a first plurality of subjective factor sets, jointly optimizing the first subjective score set and the first plurality of subjective factor sets to generate a second subjective score set and a second plurality of subjective factor sets, wherein the second subjective score set compensates for at least a first subjective factor set included in the second plurality of subjective factor sets, and computing a participant evaluation report based on at least a second subjective factor set included in the second plurality of subjective factor sets.

12. The one or more non-transitory computer readable media of clause 11, wherein the first subjective factor set comprises a participant bias set, and the second subjective factor set comprises a participant inconsistency set.

13. The one or more non-transitory computer readable media of clauses 11 or 12, wherein the first subjective factor set includes a different participant bias for each participant that is associated with the plurality of individual scores.

14. The one or more non-transitory computer readable media of any of clauses 11-13, wherein computing the participant evaluation report comprises ranking a plurality of participants associated with the plurality of individual scores based on the at least the second subjective factor set to determine a ranked participant set, and generating the participant evaluation report based on the ranked participant set.

15. The one or more non-transitory computer readable media of any of clauses 11-14, wherein the participant evaluation report comprises a rejection recommendation, and wherein computing the rejection recommendation comprises determining at least one participant associated with the plurality of individual scores based on the at least the second subjective factor set and a rejection criterion, and generating the rejection recommendation specifying the at least one participant.

16. The one or more non-transitory computer readable media of any of clauses 11-15, wherein jointly optimizing the first subjective score set and the first plurality of subjective factor sets comprises generating a maximum likelihood estimation formulation of the model based on a log maximum likelihood function.

17. The one or more non-transitory computer readable media of any of clauses 11-16, further comprising executing an alternating projection solver on the maximum likelihood estimation formulation.

18. The one or more non-transitory computer readable media of any of clauses 11-17, wherein a first individual score included in the plurality of individual scores represents an assessment of visual quality for a reconstructed video clip derived from an encoded video clip.

19. The one or more non-transitory computer readable media of any of clauses 11-18, wherein the second subjective score set includes a perceptual video quality score that estimates the visual quality of the reconstructed video clip as perceived by a hypothetical consistent and unbiased subject.

20. In some embodiments, a system comprises one or more memories storing instructions and one or more processors coupled to the one or more memories that, when executing the instructions, perform the steps of generating a model that includes a plurality of individual scores and a first plurality of parameters that includes a first subjective score set and a first plurality of subjective factor sets, performing one or more optimization operations on the first plurality of parameters to generate a second plurality of parameters that includes a second subjective score set and a second plurality of subjective factor sets, wherein the second subjective score set compensates for at least a first subjective factor set included in the second plurality of subjective factor sets, and evaluating a plurality of participants associated with the plurality of individual scores based on at least a second subjective factor set included in the second plurality of subjective factor sets to generate a participant evaluation report. Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory (EPROM or Flash memory), an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for mitigating scoring inaccuracies in subjective quality experiments, the method comprising:

performing, via a propagation solver, a plurality of iterative operations to update a first plurality of parameters of a model that includes a plurality of individual scores assigned by a plurality of participants during a first experiment round to generate a first subjective factor set comprising a different participant inconsistency for each participant in the plurality of participants, wherein performing the plurality of iterative operations includes generating a maximum likelihood estimation formulation of the model and executing the propagation solver to automatically compute a solution for the maximum likelihood estimation formulation to generate the first subjective factor set comprising initiating an update rule generator to generate a set of update rules for updating the first plurality of parameters, and iteratively initiating a propagation engine to iteratively update the first plurality of parameters based on the set of update rules and a refresh rate until a stop threshold is satisfied to generate an optimized plurality of parameters for the model that comprises the solution for the maximum likelihood estimation formulation, wherein the first subjective factor set optimized plurality of parameters corresponds to the first subjective factor set;

computing a ranking of the plurality of participants with respect to each other based on the first subjective factor set; and generating a participant evaluation report that includes information indicating a portion of the plurality of participants that, based on the ranking of the plurality of participants with respect to each other, meet a participant inconsistency criterion for exclusion from a second experiment round during which the plurality of participants less the portion of the plurality of participants assign one or more additional individual scores, wherein the participant inconsistency criterion specifies a predefined number of participants included in the plurality of participants that are associated with highest participant consistencies.

2. The computer-implemented method of claim 1, wherein the first plurality of parameters includes a first subjective score set and a first plurality of subjective factor sets.

3. The computer-implemented method of claim 2, wherein performing the plurality of iterative operations comprises performing one or more optimization operations on the first plurality of parameters of the model to generate a second plurality of parameters that includes a second subjective score set and a second plurality of subjective factor sets, wherein the second subjective score set compensates for at least a second subjective factor set included in the second plurality of subjective factor sets, and wherein the second plurality of subjective factor sets includes the first subjective factor set.

4. The computer-implemented method of claim 3, wherein the first subjective factor set comprises a participant inconsistency set, and the second subjective factor set comprises a participant bias set.

5. The computer-implemented method of claim 1, wherein generating the participant evaluation report comprises generating a ranked participant set based on the ranking, wherein the participant evaluation report includes the ranked participant set.

6. The computer-implemented method of claim 1, wherein the participant evaluation report comprises a rejection recommendation that specifies at least one participant associated with the plurality of individual scores.

7. The computer-implemented method of claim 1, wherein the maximum likelihood estimation formulation of the model is generated based on a log maximum likelihood function.

8. The computer-implemented method of claim 1, wherein a first individual score included in the plurality of individual scores comprises an assessment of visual quality for a reconstructed video clip derived from an encoded video clip.

9. The computer-implemented method of claim 1, wherein the refresh rate specifies a magnitude of the updates to the first plurality of parameters and a rate at which the propagation engine approaches the solution for the maximum likelihood estimation formulation.

10. The computer-implemented method of claim 1, wherein the stop threshold specifies an acceptable accuracy for the solution for the maximum likelihood estimation formulation.

11. The computer-implemented method of claim 1, wherein the propagation solver further initiates an initial value generator to compute initial values for the first plurality of parameters and initiates the update rule generator to simplify the maximum likelihood estimation formulation.

12. One or more non-transitory computer readable media including instructions that, when executed by one or more processors, cause the one or more processors to mitigate scoring inaccuracies in subjective quality experiments, by performing the steps of:

performing, via a propagation solver, a plurality of iterative operations to update a first plurality of parameters of a model that includes a plurality of individual scores assigned by a plurality of participants during a first experiment round to generate a first subjective factor set comprising a different participant inconsistency for each participant in the plurality of participants, wherein performing the plurality of iterative operations includes generating a maximum likelihood estimation formulation of the model and executing the propagation solver to automatically compute a solution for the maximum likelihood estimation formulation to generate the first subjective factor set comprising initiating an update rule generator to generate a set of update rules for updating the first plurality of parameters, and iteratively initiating a propagation engine to iteratively update the first plurality of parameters based on the set of update rules and a refresh rate until a stop threshold is satisfied to generate an optimized plurality of parameters for the model that comprises the solution for the maximum likelihood estimation formulation, wherein the first subjective factor set optimized plurality of parameters corresponds to the first subjective factor set;

computing a ranking of the plurality of participants with respect to each other based on the first subjective factor set; and generating a participant evaluation report that includes information indicating a portion of the plurality of participants that, based on the ranking of the plurality of participants with respect to each other, meet a participant inconsistency criterion for exclusion from a second experiment round during which the plurality of participants less the portion of the plurality of participants assign one or more additional individual scores, wherein the participant inconsistency criterion specifies a predefined number of participants included in the plurality of participants that are associated with highest participant consistencies.

13. The one or more non-transitory computer readable media of claim 12, wherein the first plurality of parameters includes a first subjective score set and a first plurality of subjective factor sets.

14. The one or more non-transitory computer readable media of claim 13, wherein performing the plurality of iterative operations comprises performing one or more optimization operations on the first plurality of parameters of the model to generate a second plurality of parameters that includes a second subjective score set and a second plurality of subjective factor sets, wherein the second plurality of subjective factor sets includes the first subjective factor set, and wherein the second subjective score set compensates for at least a second subjective factor set included in the second plurality of subjective factor sets.

15. The one or more non-transitory computer readable media of claim 14, wherein the first subjective factor set comprises a participant inconsistency set, and the second subjective factor set comprises a participant bias set.

16. The one or more non-transitory computer readable media of claim 14, wherein the second subjective score set includes a perceptual video quality score that estimates visual quality of a reconstructed video clip as perceived by a hypothetical consistent and unbiased subject.

17. The one or more non-transitory computer readable media of claim 12, the steps further comprising generating a ranked participant set based on the ranking, wherein the participant evaluation report includes the ranked participant set.

18. The one or more non-transitory computer readable media of claim 12, wherein the participant evaluation report comprises a rejection recommendation, and further comprising computing the rejection recommendation by:

determining at least one participant associated with the plurality of individual scores based on at least the first subjective factor set and the participant inconsistency criterion; and generating the rejection recommendation specifying the at least one participant.

19. A system comprising:

one or more memories storing instructions; and one or more processors coupled to the one or more memories that, when executing the instructions, perform the steps of:

performing, via a propagation solver, a plurality of iterative operations to update a first plurality of parameters of a model that includes a plurality of individual scores assigned by a plurality of participants during a first experiment round to generate a first subjective factor set comprising a different participant inconsistency for each participant in the plurality of participants, wherein performing the plurality of iterative operations includes generating a maximum likelihood estimation formulation of the model and executing the propagation solver to automatically compute a solution for the maximum likelihood estimation formulation to generate the first subjective factor set comprising initiating an update rule generator to generate a set of update rules for updating the first plurality of parameters, and iteratively initiating a propagation engine to iteratively update the first plurality of parameters based on the set of update rules and a refresh rate until a stop threshold is satisfied to generate an optimized plurality of parameters for the model that comprises the solution for the maximum likelihood estimation formulation, wherein the first subjective factor set optimized plurality of parameters corresponds to the first subjective factor set;

computing a ranking of the plurality of participants with respect to each other based on the first subjective factor set; and generating a participant evaluation report that includes information indicating a portion of the plurality of participants that, based on the ranking of the plurality of participants with respect to each other, meet a participant inconsistency criterion for exclusion from a second experiment round during which the plurality of participants less the portion of the plurality of participants assign one or more additional individual scores, wherein the participant inconsistency criterion specifies a predefined number of participants included in the plurality of participants that are associated with highest participant consistencies.

* * * * *